United States Patent [19]

Kron et al.

[11] Patent Number: 4,912,596

[45] Date of Patent: Mar. 27, 1990

[54] DIELECTRIC LIQUIDS

[75] Inventors: Rudolf Kron, Leverkusen; Alfons Klein, Duesseldorf; Helmut Fiege, Leverkusen, all of Fed. Rep. of Germany

[73] Assignee: Bayer Aktiengesellschaft, Leverkusen, Fed. Rep. of Germany

[21] Appl. No.: 323,458

[22] Filed: Mar. 14, 1989

[30] Foreign Application Priority Data

Mar. 24, 1988 [DE] Fed. Rep. of Germany ....... 3809934

[51] Int. Cl.⁴ .............................................. H01B 3/48
[52] U.S. Cl. ..................................... 361/327; 252/579
[58] Field of Search ....................... 252/570, 579, 580; 522/29; 361/314–319, 327

[56] References Cited

U.S. PATENT DOCUMENTS

| | | | |
|---|---|---|---|
| 3,833,978 | 9/1974 | Eustance | 361/315 X |
| 3,937,664 | 2/1976 | Tanimoto et al. | 361/315 X |
| 4,121,275 | 10/1978 | Ross et al. | 361/315 X |
| 4,203,145 | 5/1980 | Klein et al. | 361/317 |
| 4,276,184 | 6/1981 | Mandelcorn et al. | 252/579 |
| 4,320,034 | 3/1982 | Lapp et al. | 361/315 X |
| 4,410,869 | 10/1983 | Klein et al. | 361/315 X |

*Primary Examiner*—Donald A. Griffin
*Attorney, Agent, or Firm*—Sprung Horn Kramer & Woods

[57] ABSTRACT

The invention relates to the use of certain aromatic compounds of the formula

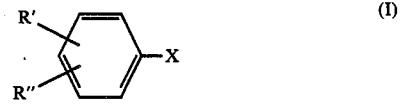

in which
R', R" and X have the meaning given in the description, as dielectric liquids for high-energy voltage-storage capacitors, and to dielectric liquids containing these aromatic compounds, for these high-power capacitors.

8 Claims, No Drawings

DIELECTRIC LIQUIDS

The invention relates to the use of certain aromatic compounds as dielectric liquids for high-energy voltage-storage capacitors, and to dielectric liquids containing these aromatic compounds, for these high-power capacitors.

A large number of compounds and compound mixtures has already been proposed as dielectric liquids (see, for example, EP-A 0,103,868, and the U.S. patent specifications 3,948,788, 4,119,555, 4,054,937, 4,203,145 and 4,410,896). These known dielectric liquids are distinguished by good dielectric properties and favourable viscosities at low temperatures, i.e. properties which are important for use in modern high-current capacitors, for example for phase compensation. However, these known liquid dielectrics are not suitable for use in the new high-energy voltage-storage capacitors, as are required for lasers, in nuclear fusion research and for pulse discharges. In order to store large amounts of electrical energy in the smallest possible space, it is not only solid dielectrics having high dielectric constants that are required, but also liquid dielectrics which have significantly higher dielectric constants than the liquid dielectrics known hitherto.

For liquid dielectrics in high-energy voltage-storage capacitors, dielectric constants >10 are required, which, in combination with the plastic foils of high dielectric constant used in such capacitors, make it possible to generate and store a high energy density and amount in the capacitors. In addition, it is required of these liquid dielectrics that they wet the plastic foils of high dielectric constant used in these capacitors and are highly compatible therewith. In addition, the following demands, inter alia, are made of the impregnating agents for these high-energy capacitors: they must have an electrical resistance >$10^8$ Ohm.cm, a high breakdown voltage of >50 kV/2.5 mm, low viscosity <100 mm²/s and good thermoconductivity. The demands on the dielectric loss factors of the liquid dielectrics used in the high-energy capacitors are less stringent than the demands on the loss factors of the impregnating agents used in standard alternating-voltage high-current capacitors since the high-energy capacitors are only subjected to direct voltage, in contrast to standard alternating-voltage capacitors.

The dielectrics which have hitherto been used as a trial in high-energy capacitors, namely castor oil and tricresyl phosphate, are unsatisfactory due to their excessively low dielectric constants, their poor wetting properties for the plastic foils of high dielectric constants, and their inadequate stability to hydrolysis.

Surprisingly, it has now been found that certain aromatic compounds not only have the high dielectric constant of >10 required, but also, in addition, have high electrical resistance, high breakdown voltage, a viscosity which is suitable for dielectric liquids and the necessary wetting properties and compatibility with the plastic foils of high dielectric constant which are used in the high-energy capacitors.

The invention therefore relates to the use of aromatic compounds of the formula

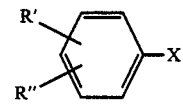

in which
R′ and R″, independently of one another, stand for H, halogen, preferably chlorine, or $C_1$–$C_3$-alkyl, and
X stands for a phenoxy group of the formula

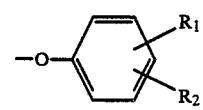

in which
$R_1$ is an electron-withdrawing substituent, preferably a CN, $NO_2$ or acyl group, or a halogen atom, preferably a chlorine atom, and
$R_2$ denotes H, $C_1$–$C_3$-alkyl or halogen, preferably Cl, or for an acyl group of the formulae $R_3$—$SO_2$— or $R_4$—CO— in which
$R_3$ is a $C_2$–$C_4$-alkyl radical and
$R_4$ denotes a $C_1$–$C_6$-alkyl or an optionally chlorine-substituted phenyl radical,
with the proviso that R′ and R″ are not simultaneously H if X stands for the $R_4$—CO group, as liquid dielectrics for high-energy voltage-storage capacitors, and to liquid dielectrics for high-energy voltage-storage capacitors which contain these aromatic compounds of the formula I.

Suitable acyl groups for $R_1$ are, in particular, those which are derived from carboxylic acids, preferably aliphatic $C_1$–$C_4$-carboxylic acids.

Examples which may be mentioned of phenoxy groups of the formula (II) are: the 2—CN—, 2—$NO_2$—, 2—chloro—4—$NO_2$—, 2,6-dichloro- and methyl-acetyl-phenoxy group.

Representatives which may be mentioned as examples of compounds of the formula (I) in which X stands for a substituted phenoxy group are: 2—CN—, 2—$NO_2$—, 2—chloro—4—$NO_2$— and 2,6-dichloro-diphenyl ether, furthermore the isomer mixture of acetylated ditolyl ethers produced on reaction of ditolyl ether isomer mixtures with acetyl chloride (1 mole of acetyl chloride per mole of ditolyl ether). This mixture may be described by means of the formula

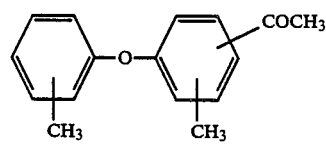

Examples which may be mentioned of acyl groups of the formula $R_3$—$SO_2$— are: the ethane-, propane-, butane- and 4-chlorophenyl-sulphonyl group; examples which may be mentioned of acyl groups of the formula $R_4$—CO— are: the acyl groups derived from aliphatic and aromatic carboxylic acids, such as the acetyl, benzoyl and benzoyl groups which are substituted by chlorine or $C_1-C_4$-groups, for example the 2-chloro-benzoyl or methylbenzoyl group.

Representatives which may be mentioned as examples of compounds of the formula (I) in which X stands for a sulphonyl group are: ethyl 4-chloro-phenyl sulphone, isopropyl phenyl sulphone, butyl phenyl sulphone and diethylphenyl 4-chloro-phenyl sulphone.

Representatives which may be mentioned as examples of compounds of the formula (I) in which X stands for an acyl group derived from a carboxylic acid are: alkylacetophenones such as 4-methylacetophenone, monohalogenated acetophenones such as 4-chloroacetophenone, furthermore optionally chlorinated dialkylbenzophenones such as diethylphenyl phenyl ketone and diethylphenyl 2-chlorophenyl ketone.

The aromatic compounds of the formula (I) to be used as dielectrics of high dielectric constant are known or can at least be prepared by known methods.

When the aromatic compounds of the formula (I) to be used according to the invention are used in the high-energy capacitors, the stabilizers, such as acid acceptors nating agents for fluorinated plastic foils (DC >10) and in high-energy capacitors:
(1) 2-CN-diphenyl ether
(2) 2-$NO_2$-diphenyl ether
(3) 2,6-dichloro-diphenyl ether
(4)

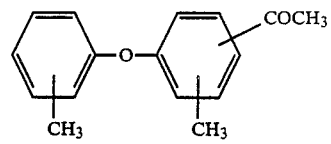

(5) ethyl 4-chlorophenyl sulphone
(6) isopropyl phenyl sulphone
(7) butyl phenyl sulphone
(8) 4-methyl-acetophenone
(9) diethylphenyl phenyl ketone
(10) diethylphenyl 2-chlorophenyl ketone The properties of the compounds are collated in the table below:

TABLE

| Properties | Compound | | | | | | | | | |
|---|---|---|---|---|---|---|---|---|---|---|
| | 1 | 2 | 3 | 4 | 5 | 6 | 7 | 8 | 9 | 10 |
| Dielectric constant (20° C.) | 33.8 | 28.6 | 11.1 | 10.1 | 28.8 | 42.0 | 30.0 | 16.4 | 10.0 | 11.9 |
| Breakdown voltage (kv) | | 56 | | 74 | | | 51 | 55 | | |
| Specific breakdown resistance (Ω · cm) | $4.3 \cdot 10^8$ | $4.3 \cdot 10^9$ | $1.6 \cdot 10^{12}$ | $2.8 \cdot 10^{10}$ | $6.0 \cdot 10^8$ | $1.4 \cdot 10^9$ | $9.3 \cdot 10^8$ | $2.9 \cdot 10^8$ | $1.5 \cdot 10^{11}$ | $1.5 \cdot 10^{10}$ |
| Boiling point (°C./mbar) | 132/0.5 | 137/0.5 | 115/0.5 | 125-150/0.5 | 122/0.7 | 119/1.4 | 129/1.0 | 100/18 | 135-145/0.6 | 154/0.8 |
| Pour point: (°C.) | −24 | −33 | −44 | −18 | | −33 | −39 | −18 | −36 | −27 |
| Kin. viscosity (20° C. mm/sec) | 29 | 19 | 22 | 62 | 80 | 39 | 36 | 2,3 | 44 | 80 |
| Density (20° C.) | 1.1332 | 1.2412 | 1.1631 | 1.0975 | 1.3170 | 1.615 | 1.1294 | 1.0044 | 1.0309 | 1.1206 |
| Flash point (°C.): | 180 | 186 | 191 | 190 | 186 | 164 | 178 | 106 | 184 | 196 | and oxidation inhibitors, which are customarily used in liquid dielectrics may be added to the compounds. The acid acceptors used are preferably epoxy compounds such as 1,2-epoxy-3-phenoxypropane, bis-(3,4-epoxy-6-methylcyclohexyl-methyl) adipate, 1-epoxy-ethyl-3,4-epoxy-cyclohexane, 3,4-epoxycyclohexane, 3,4-epoxy-cyclohexylmethyl 3,4-epoxy-cyclohexane-carboxylate, 3,4-epoxy-6-methycyclohexylmethyl 3,4-epoxy-6-methylcyclohexane-carboxylate and 2,2-bis-(4-hydroxyphenyl)-propane diglycidyl ether.

The oxidation inhibitors employed are preferably carbocyclic compounds containing one or two hydroxyl groups; for example 2,6-di-tert.-butyl-p-cresol, 2,2-bis-(4-hydroxyphenyl)-propane and 4,4'-butylidene-bis-(6-tert.-butyl-m-cresol).

The acid acceptors are generally used in an amount of from 0.1 to 5% by weight, preferably 0.3 to 1% by weight, based on the total weight of the liquid dielectric; the oxidation inhibitors are preferably used in an amount of from 0.01 to 0.5% by weight, preferably 0.05 to 0.2% by weight, based on the total weight of the liquid dielectric.

EXAMPLES

The following compounds of the formula (I) to be used according to the invention were used as impreg-

What is claimed is:

1. A high-energy voltage-storage capacitor comprising a liquid dielectric wherein the liquid dielectric is a compound of the formula

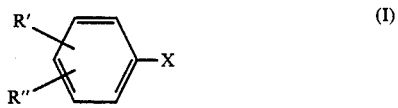

in which
R' and R", independently of one another, are H or $C_1-C_3$-alkyl, and
X is a phenoxy group of the formula

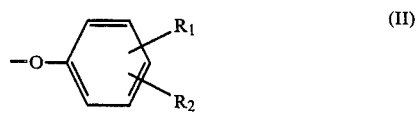

in which
$R_1$ is an electron-withdrawing substituent, and
$R_2$ is H or $C_1-C_3$-alkyl, or X is an acyl group of the formulae $R_3-SO_2-$ or $R_4-CO-$ in which R$_3$ is a C$_2$–C$_4$-alkyl radical, and R$^4$ is C$_1$–C$_6$-alkyl or phenyl, with the proviso that R' and R" are not simultaneously H is X is an R$_4$—CO group.

2. The capacitor of claim 1 wherein in the formula I X is a phenoxy radical which is substituted by C$_1$–C$_3$-alkyl and an acetyl group, a C$_2$–C$_4$-alkyl-SO$_2$— or a C$_1$–C$_6$-alkyl-CO group.

3. The capacitor of claim 1 wherein the liquid dielectric is a monoacetylated ditolyl ether (isomer mixture), i-propyl phenyl sulphone, n-butyl phenyl sulphone and/or 4-methylacetophenone.

4. A liquid dielectric composition comprising (a) an aromatic compound of the formula

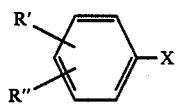
(I)

in which

R' and R", independently of one another, are H or C$_1$–C$_3$-alkyl, and

X is a phenoxy group of the formula

(II)

in which

R$_1$ is an electron-withdrawing substituent and

R$_2$ is H or C$_1$–C$_3$-alkyl, or X is an acyl group of the formulae

R$_3$—SO$_2$— or R$_4$—CO— in which

R$_3$ is a C$_2$–C$_4$-alkyl radical, and

R$_4$ is C$_1$–C$_6$-alkyl or phenyl with the proviso that R' and R" are not simultaneously H when X is an R$_4$—CO group, and (b) a stabilizer customarily used in liquid dielectrics.

5. Dielectric composition of claim 4 wherein the stabilizer is an acid acceptor.

6. The dielectric composition of claim 5 wherein the acid acceptor is used in an amount of from 0.1 to 5% by weight based on the total weight of the liquid dielectric composition.

7. The dielectric composition of claim 4 wherein the stabilizer is an oxidation inhibitor.

8. The dielectric composition of claim 7, wherein the oxydation inhibitor is used in an amount of 0.01 to 0.5% by weight based on the weight of the liquid dielectric composition.

* * * * *

UNITED STATES PATENT AND TRADEMARK OFFICE
CERTIFICATE OF CORRECTION

PATENT NO. : 4,912,596

DATED : March 27, 1990

INVENTOR(S) : Kron et al.

It is certified that error appears in the above-identified patent and that said Letters Patent is hereby corrected as shown below:

Col. 5, claim 1  After " H " delete " is " and substitute -- when --
line 6

Signed and Sealed this

Tenth Day of March, 1992

Attest:

HARRY F. MANBECK, JR.

*Attesting Officer*    *Commissioner of Patents and Trademarks*